United States Patent
Moyer et al.

(10) Patent No.: US 7,444,668 B2
(45) Date of Patent: Oct. 28, 2008

(54) METHOD AND APPARATUS FOR DETERMINING ACCESS PERMISSION

(75) Inventors: William C. Moyer, Dripping Springs, TX (US); Afzal M. Malik, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 883 days.

(21) Appl. No.: 10/448,031

(22) Filed: May 29, 2003

(65) Prior Publication Data

US 2004/0243823 A1   Dec. 2, 2004

(51) Int. Cl.
G06F 7/04 (2006.01)
G06F 13/00 (2006.01)
G06F 12/00 (2006.01)
G06F 13/36 (2006.01)

(52) U.S. Cl. .............................. 726/2; 726/16; 710/110; 710/240; 710/113

(58) Field of Classification Search ................. 713/166, 713/193; 726/26, 27, 2
See application file for complete search history.

(56) References Cited

U.S. PATENT DOCUMENTS

| | | | |
|---|---|---|---|
| 4,495,573 A * | 1/1985 | Ballegeer et al. ............ 710/110 |
| 4,747,139 A * | 5/1988 | Taaffe ......................... 380/44 |
| 4,979,100 A * | 12/1990 | Makris et al. ............... 710/117 |
| 4,987,529 A * | 1/1991 | Craft et al. ................... 710/113 |
| 5,012,515 A * | 4/1991 | McVitie ....................... 726/21 |
| 5,619,661 A * | 4/1997 | Crews et al. ................ 710/119 |
| 5,796,968 A * | 8/1998 | Takamiya .................... 710/113 |
| 5,805,835 A * | 9/1998 | Jeddeloh et al. ............. 710/107 |
| 5,819,052 A * | 10/1998 | Sonoda ........................ 710/113 |
| 5,832,207 A * | 11/1998 | Little et al. ................... 726/36 |
| 5,956,493 A * | 9/1999 | Hewitt et al. ................ 710/113 |
| 6,021,455 A | 2/2000 | Kondo et al. |
| 6,237,057 B1 * | 5/2001 | Neal et al. .................... 710/309 |
| 6,324,612 B1 * | 11/2001 | Chen et al. ................... 710/306 |
| 6,438,635 B1 * | 8/2002 | Date et al. .................... 710/113 |
| 6,473,825 B1 * | 10/2002 | Worley et al. ............... 710/306 |
| 6,499,092 B1 | 12/2002 | Harwood et al. |
| 6,581,124 B1 * | 6/2003 | Anand .......................... 710/305 |
| 6,629,178 B1 * | 9/2003 | Smith .......................... 710/240 |
| 6,662,251 B2 * | 12/2003 | Brock et al. ................. 710/110 |
| 6,704,871 B1 * | 3/2004 | Kaplan et al. ................ 713/192 |

(Continued)

OTHER PUBLICATIONS

Moyer, William C. et al., Data Processing System with Peripheral Access Protection and Method Therefor, U.S. Appl. No. 10/094,082 filed Mar. 8, 2002.

(Continued)

Primary Examiner—Emmauel L Moise
Assistant Examiner—Techane J Gergiso
(74) Attorney, Agent, or Firm—Joanna G. Chiu; Susan C. Hill

(57) ABSTRACT

A method and apparatus for determining access protection (96) includes receiving a plurality of access requests (84) corresponding to a plurality of masters (12, 14), determining access permissions (86), providing state information (60), determining access permissions (86) based on the access request (84), and selectively modifying the access permissions based on the state information (90). The state information (60) may relate to debug operation, operation from unsecure or unverified memories, memory programming, direct memory access operation, boot operation, software security verification, security levels, security monitor operation, operating mode, fault monitor, external bus interface, etc (88).

19 Claims, 2 Drawing Sheets

U.S. PATENT DOCUMENTS

| | | | | |
|---|---|---|---|---|
| 6,708,273 | B1 * | 3/2004 | Ober et al. | 713/189 |
| 6,785,810 | B1 * | 8/2004 | Lirov et al. | 713/165 |
| 6,820,152 | B2 * | 11/2004 | Kanzaki et al. | 710/244 |
| 7,036,020 | B2 * | 4/2006 | Thibadeau | 713/193 |
| 7,055,038 | B2 * | 5/2006 | Porter et al. | 713/193 |
| 7,073,059 | B2 * | 7/2006 | Worely et al. | 713/168 |
| 7,216,362 | B1 * | 5/2007 | Strongin et al. | 726/16 |
| 2002/0099947 | A1 * | 7/2002 | Evans | 713/193 |
| 2003/0097248 | A1 * | 5/2003 | Terashima et al. | 703/28 |
| 2003/0097505 | A1 * | 5/2003 | Kato | 710/113 |
| 2003/0101341 | A1 * | 5/2003 | Kettler et al. | 713/162 |
| 2004/0177266 | A1 * | 9/2004 | Moyer et al. | 713/200 |
| 2004/0193905 | A1 * | 9/2004 | Lirov et al. | 713/193 |
| 2004/0218214 | A1 * | 11/2004 | Kihara et al. | 358/1.16 |
| 2006/0123248 | A1 * | 6/2006 | Porter et al. | 713/193 |

OTHER PUBLICATIONS

Moyer, William C. et al., Data Processing System with Peripheral Access Ptotection and Method Therefor, U.S. Appl. No. 10/384,024 filed Mar. 7, 2003.

* cited by examiner

METHOD AND APPARATUS FOR DETERMINING ACCESS PERMISSION

RELATED APPLICATIONS

This Application is related to U.S. patent application Ser. No. 10/094,082, filed Mar. 8, 2002, entitled "Data Processing System with Peripheral Access Protection and Method Therefor", and U.S. patent application Ser. No. 10/384,024, filed Mar. 7, 2003, entitled "Data Processing System with Peripheral Access Protection and Method Therefor", both assigned to the current assignee hereof.

FIELD OF THE INVENTION

The present invention relates to access permissions, and more particularly, to access permission circuitry for determining access permissions within, for example, a data processing system.

RELATED ART

In system on a chip (SoC) solutions, it is common to have multiple masters with shared peripheral and slave devices, such as, for examples, memories. The contents of all or some of the shared peripheral and slave devices may need to be protected against tampering, copying, or interrogation, such as by errant or otherwise hostile software running on certain masters which may corrupt the system. For example, viruses may be introduced by software running on unsecured masters which may be used to gain access to secure information within the peripheral and slave devices of the system. Furthermore, certain bus masters in the system may be considered secure while others considered un-secure, and these considerations may change as the state of the system changes. Therefore, in order to ensure system integrity and security, there is a need to protect a system from errant or otherwise hostile software running on an unsecured master.

BRIEF DESCRIPTION OF THE DRAWINGS

The present invention is illustrated by way of example and not limited by the accompanying figures, in which like references indicate similar elements, and in which.

Figure 1:
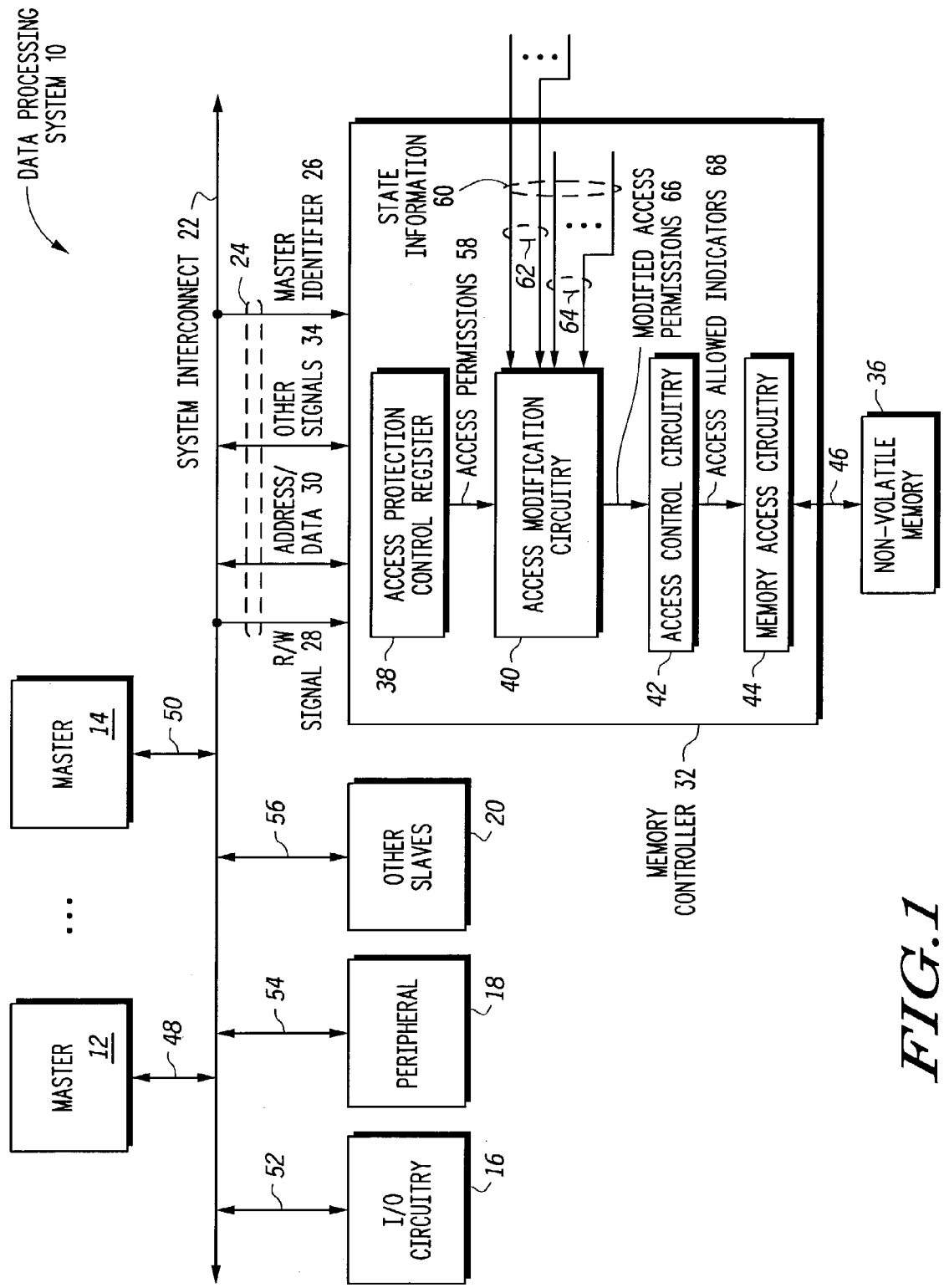
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

To ensure system integrity and security, it is desirable to ensure that a system, such as, for example, a multiple master data processing system, not be compromised by errant or otherwise hostile software running on an unsecured processor or other master. For example, multiple masters in a multiple master system may share a same resource such as, for example, a peripheral or slave device of the system. Some of the multiple masters may be considered secure while others may be considered unsecure. As used herein, a secure master refers to a master that is generally less accessible and less susceptible to corruption than an unsecure master, which is generally more accessible and more susceptible to corruption. For example, a secure master may have limited accessibility or may execute instructions that are completely controlled by the manufacturer of the master or SoC (i.e. the software running on the secure master can be considered as trusted or secure software). However, an unsecure master may be a general applications processor that may be receive and execute third-party software (e.g. user developed software) or any other untrusted software (where the contents and the function of the software are generally unknown). Since the software is untrusted, it may be errant or otherwise hostile software which may attempt to corrupt other portions of the system or gain access to secure information. Furthermore, the status of a particular master as secure or unsecure may change as the state of the data processing system changes.

Therefore, one embodiment of the present invention allows the contents of slaves or peripherals, such as, for example, a non-volatile memory, to be secured in a manner which allows program execution to proceed from the non-volatile memory when operating in a secured state, but to prevent unauthorized accesses from occurring when operating in a less-secured state. One embodiment provides for a method which allows system state to modify or override previously programmed access protection policies of the data processing system, as will be described below in reference to FIGS. 1-3. The overrides may be used, for example, to restrict (or conversely, to broaden access permissions for) read and write accesses, together or independently, for each of the masters in the system to a resource of the system (e.g. a slave device, peripheral device, memory, shared resource etc.). Furthermore, these overrides may be dynamically changed when a change in state information occurs. Also, as will be described further below, state information may include any type of information relating to the state of the data processing system, such as, for example, information relating to enablement of debug mode, execution of programs from unsecured or unverified memory regions, reprogramming of portions of nonvolatile memories, etc.

FIG. 1 illustrates one embodiment of a data processing system 10. Data processing system 10 includes a master 12 (also referred to as an interconnect or bus master 12), a master 14 (also referred to as an interconnect or bus master 14), a memory controller 32, a non-volatile memory 36, a system interconnect 22, I/O circuitry 16, a peripheral 18, and other slaves 20. Master 12 is bidirectionally coupled to system interconnect 22 via conductors 48, master 14 is bidirectionally coupled to system interconnect 22 via conductors 50, I/O circuitry is bidirectionally coupled to system interconnect 22 via conductors 52, peripheral 18 is bidirectionally coupled to system interconnect 22 via conductors 54, other slaves 20 is bidirectionally coupled to system interconnect 22 via conductors 56, and memory controller 32 is bidirectionally coupled to system interconnect 22 via conductors 24. Conductors 24 include conductors for communicating a master identifier 26, address/data 30, a R/W signal 28, and other signals 34.

Memory controller 32 includes an access protection control register 38, access modification circuitry 40, access control circuitry 42, and memory access circuitry 44, and is bidirectionally coupled to non-volatile memory 36 via conductors 46. Access protection control register provides access permissions 58 to access modification circuitry 40. Access modification circuitry 40 receives state information 60 via conductors 62 from information within data processing system 10 and via conductors 64 from information within memory controller 32, and provides modified access permissions 66 to access control circuitry 42. Note that in alternate embodiments, state information 60 may include only that information provided from data processing system 10 (via conductors 62) or may include only that information provided from within memory controller 32. Furthermore, state information 60 may include information provided from sources external to data processing system 10 (via some or all of conductors 62). State information 60 may therefore include any type of signals or indicators which provide the desired state information to access modification circuitry 40, as will be discussed in more detail below. Access control circuitry 42 provides access allowed indicators 68 (which may include one or more indicators) to memory access circuitry 44.

Although only one peripheral 18 is illustrated in FIG. 1, data processing system 10 may include any number of peripherals coupled to system interconnect 22. Likewise, any number of masters and slaves may be coupled to system interconnect 22 and are not limited to those shown in FIG. 1. Note also that in one embodiment, all of data processing system 10 may be located on a single integrated circuit or within a same device. Alternatively, data processing system 10 may include any number of separate integrated circuits or separate devices interconnected with each other. For example, in one embodiment, the memory and memory controller (such as, for example, non-volatile memory 36 and memory controller 32) may be located on one or more integrated circuits, separate from the rest of data processing system 10.

In one embodiment, master 12 and master 14 may be processors capable of executing instructions, such as microprocessors, digital signal processors, etc., or may include any other type of interconnect or bus master, such as direct memory access (DMA) circuitry or debug circuitry. Also, although only two masters are illustrated, data processing system 10 may include any number of masters (one or more) as needed. Note also that at any given point of operation, each of master 12 and 14 may have different levels of security. That is, for example, depending on the state of data processing system 10 at a particular point of operation, each of master 12 and 14 may either be a secured or an unsecured master. Peripheral 18 may be any type of peripheral, such as a universal asynchronous receiver transmitter (UART), a real time clock (RTC), a keyboard controller, any type of memory, etc. Note that other slaves 20 may include any type of interconnect slaves, such as, for example, a memory accessible by masters 12 and 14, as well as any type of peripheral which resides on the system bus, including the same types of peripherals as peripheral 18. I/O circuitry 16 may include any type of I/O circuitry which receives or provides information internal to or external to data processing system 10.

In the illustrated embodiment, memory controller 32 and non-volatile memory 36 correspond to another slave coupled to system interconnect 22. Note that, in one embodiment, non-volatile memory 36 may be shared by at least two masters coupled to system interconnect 22 (such as, for example, masters 12 and 14). Non-volatile memory 36 may be located on a same integrated circuit as masters 12 and 14 or on a separate integrated circuit. Furthermore, although memory 36 is illustrated as a non-volatile memory (such as a Flash memory), memory 36 may be any type of memory, such as, for example, a read only memory (ROM), a random access memory (RAM), a dynamic RAM (DRAM), a static RAM (SRAM), non-volatile memory (e.g. Flash, MRAM), etc. Also, memory 36 may be a memory or other storage located within another peripheral or slave. In yet another embodiment, memory 36 may be any other type of resource having secured information that needs to be protected where memory controller 32 may be replaced with any type of controller having access protection circuitry for protecting the resource.

System interconnect 22 interconnects master 12, master 14, I/O circuitry 16, peripheral 18, other slaves 20, and memory controller 32. In one embodiment, as illustrated in FIG. 1, system interconnect 22 is implemented as a system bus operating according to a system bus protocol. Alternatively, system interconnect 22 can be implemented using interconnect circuitry, such as, for example, switching circuitry, which routes information between the various devices.

In operation, masters 12 and 14 request use of system interconnect 22 to request access to other slaves 20, to peripherals 18, or to non-volatile memory 36 via memory controller 32. A requesting master can provide an access request, via system interconnect 22, to memory controller 32. The access request can be, for example, a read request or a write request for either data or instructions. Memory controller 32, in response to a read access request, provides the requested information (data or instructions) back to the requesting master via system interconnect 22, assuming the requesting master has sufficient access permissions. In one embodiment, for an access request, a master identifier 26 is provided to memory controller 32 which identifies which master is requesting the current access. R/W signal 28 may also be provided to memory controller 32 to indicate whether the current access request is for a read or a write type of access. Memory controller 32 also receives address information corresponding to the current access request and provides the requested information via address/data 30. Any other signals (such as status, control, data, etc.) needed to communicate to and from memory controller 32 may be provided via other signals 34.

Each master, such as masters 12 and 14, may have corresponding access permissions that may be used to determine whether a particular access request to non-volatile memory 36 is allowable. For example, a particular master may have different access permissions for a write access or a read access to non-volatile memory 36. In one embodiment, these access permissions are stored in access protection control register 38.

Figure 2:
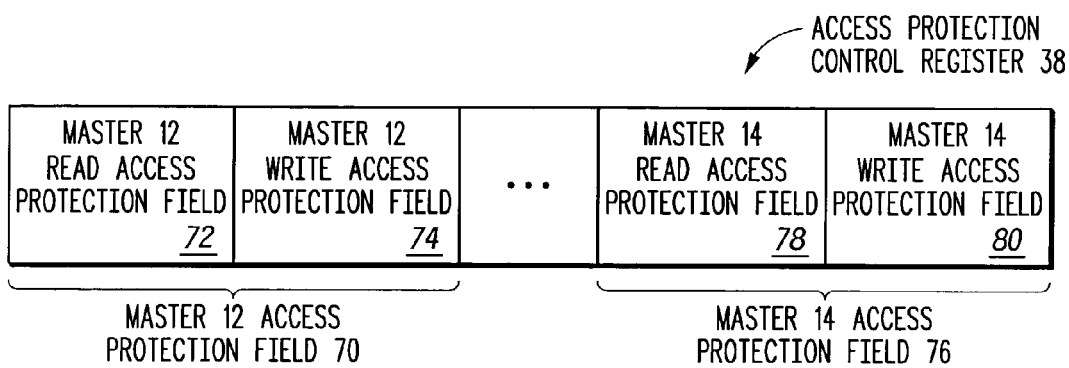
FIG. 2 illustrates, in block diagram form, an access protection control register of the data processing system of FIG. 1, in accordance with one embodiment of the present invention.

FIG. 2 illustrates one embodiment of access protection control register 38 of FIG. 1. In one embodiment, access protection control register 38 includes one access protection field for each master within data processing system 10. For example, access protection control register 38 includes master 12 access protection field 70 and master 14 access protection field 76, corresponding to masters 12 and 14, respectively. The access protection fields indicate whether particular types of accesses are allowed to non-volatile memory 36 by a particular master. For example, in the illustrated embodiment, each access protection field 70 and 76 includes a read access protection field and a write access protection field to indicate the permissions for read accesses and for write accesses for each master.

Master 12 access protection field 70 includes master 12 read access protection field 72 which indicates whether master 12 is allowed to perform read accesses to non-volatile memory 36 and master 12 write access protection field 74 which indicates whether master 12 is allowed to perform write accesses to non-volatile memory 36. Therefore, master 12 may be granted permission to perform only one of read or write accesses to non-volatile memory 36. Alternatively, master 12 may be granted permission to perform both read and write accesses or neither read nor write accesses to non-volatile memory 36, depending on the values of fields 72 and 74. In one embodiment, each of fields 72 and 74 is a one bit field to indicate whether the corresponding access type (read or write) is allowed. Similarly, master 14 access protection field 76 includes master 14 read access protection field 78 which indicates whether master 14 is allowed to perform read accesses to non-volatile memory 36 and master 14 write access protection field 80 which indicates whether master 14 is allowed to perform write accesses to non-volatile memory 36. Therefore, master 14 may be granted permission to perform only one of read or write accesses to non-volatile memory 36.

Alternatively, master 14 may be granted permission to perform both read and write accesses or neither read nor write accesses to non-volatile memory 36, depending on the values of fields 78 and 80. In one embodiment, each of fields 78 and 80 is a one bit field to indicate whether the corresponding access type (read or write) is allowed.

Note that in alternate embodiments, access protection control register 38 may include any number of access protection fields, such as fields 70 and 76. For example, access protection control register 38 may include one access protection field for every master in data processing system 10 or only a subset of masters in data processing system 10. Also, note that each of access protection fields 70 and 76 may include any number of fields to identify permissions based on different types of accesses instead of or in addition to read and write accesses (such as, for example, burst accesses). Furthermore, fields 70, 72, 74, 76, 78, and 80 may be implemented in a variety of different ways, such as by using different field definitions, different bit assignments, or a different number of bits. Alternatively, they may be organized differently, such as into separate registers or other register or memory locations elsewhere in data processing system 10. Generally, access protection control register 38 is software programmable by a secure master. In one embodiment, access protection control register 38 may be programmed upon reset.

Referring back to FIG. 1, access modification circuitry 40 may be used to modify (or override) one ore more of the access permissions stored in control register 38. For example, depending on state information 60, access modification circuitry 40 may selectively modify access permissions 58 from access protection control register 38 to provide modified access permissions 66. That is, in some cases, all of access permissions 58 may be modified to produce modified access permissions 66 or alternatively, only one or some of access permissions 58 may be modified such that modified access permissions 66 includes only one or some modified permissions. That is, modified access permissions 66 may include permissions from access protection control register 38 that are not currently being modified. Note also that modified access permissions 66 may provide broader (or less restrictive) access to memory 36 for a particular master or may restrict access to memory 36 for a particular master.

Referring back to FIG. 1, access control circuitry 42, based on modified access permissions 66, may then determine whether the current access request is allowed. For example, each master within data processing system 10 (such as master 12 and 14) may have a corresponding master identifier. In one embodiment, master 12 may correspond to master identifier 0 and master 14 may correspond to master identifier 1 such that each master may be uniquely identified with a corresponding number. In alternate embodiments, any type of identifier may be used and may be assigned in any manner, and is not limited to being in numerical order, to starting with 0, or to single digit numbers. Also, in alternate embodiments, multiple masters may share a same master identifier. Therefore, access control circuitry 42, may, based on which master is requesting the current access (indicated to access control circuitry 42 by master identifier 26) and based on the access permission (indicated to access control circuitry 42 by modified access permissions 66), determine whether an access to non-volatile memory 36 is allowed. If access is allowed, access allowed indicators 68 indicate that an access is allowed to memory access circuitry 44 such that memory access circuitry 44 may then provide the necessary signals and information to non-volatile memory 36 for completing the requested access (e.g. completing the requested read or write). However, if based on the modified access permissions 66 for the current requesting master, access control circuitry 42 determines that the access is not allowed, access allowed indicators 68 indicate that an access is not allowed such that memory access circuitry 44 does not complete the requested access. Operation of memory controller 32 will be further described in reference to FIG. 3.

Figure 3:
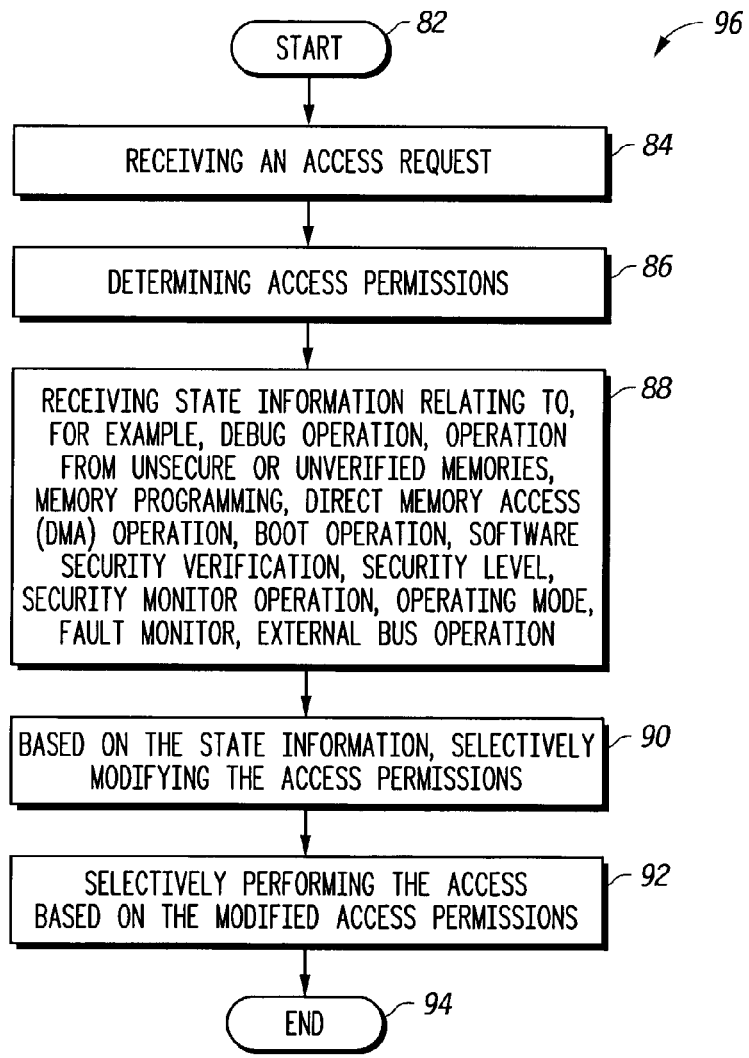
FIG. 3 illustrates, in flow diagram form, operation of the data processing system of FIG. 1 in accordance with one embodiment of the present invention.

FIG. 3 illustrates a flow 96 corresponding to the operation of memory controller 32 in accordance with one embodiment of the present invention. Flow 96 begins with start 82 and proceeds to block 84 where an access request is received. For example, master 12 or 14 may provide an access request to non-volatile memory 36 via system interconnect 22, where the access request may be, for example, a read or a write request, as indicated by R/W signal 28. Flow then proceeds to block 86 where access permissions are determined. For example, these access permissions may be provided by the fields (such as fields 70 and 76) within access protection control register 38. Flow then proceeds to block 88 where state information (such as state information 60) is received. The state information may relate to, for example, debug operation, operation from unsecured or unverified memories, memory programming, direct memory access (DMA) operation, boot operation, software security verification, security level, security monitor operation, operating mode, fault monitor, external bus operation etc. That is, information may be provided via state information 60 to access modification circuitry 40 that may indicate one or more of the above conditions, states, or operations, or may indicate information related to one or more of the conditions, states, or operations. State information 60 may therefore be received from various places within data processing system 10 (such as from master 12, master 14, I/O circuitry 16, peripheral 18, or other slaves 20), within memory controller 32, or from places external data processing system 10, or from any combination thereof.

For example, for state information relating to debug operations, one or more of the signals of state information 60 may be received from debug circuitry (not shown) coupled to system interconnect 22 as a separate unit, or, for example, as part of master 12 or 14. Signals within state information 60 may also be combined in a variety of different ways to provide combined state information or state information based on more than one resource to access modification circuitry 40. This combination circuitry may be located within access modification circuitry 40 or external to access modification circuitry 40 or even external to memory controller 32.

Referring back to FIG. 3, flow then proceeds to block 90 where based on the state information received, the access permissions may be selectively modified. For example, in one embodiment, a hardware override may be used to modify the access permissions such that certain conditions or states, communicated via state information 60, may cause a permission stored within access protection control register 38 to be overridden by hardware. For example, in one embodiment, state information 60 may be combined as desired and input to (or directly input to) hardware override circuitry, such that when certain conditions are met, the values of access protection control register 38 may be modified or replaced by hardware to create modified access permissions such as modified access permissions 66. Alternatively, access permissions 58 may be selectively modified based on state information 60 in other ways, such as by other hardware or software methods, to produce modified access permissions 66.

Flow then proceeds to block 92 where the requested access is selectively performed based on the modified access permissions. For example, if master 12 requested a read access to non-volatile memory 36, and master 12 read access protection field 72 indicated that read accesses by master 12 are allowed, then master 12's request would be performed (assuming it is not modified by access modification circuitry 40). If, however, the state information 60 indicates that the read access permission of master 12 should be modified (e.g. denied rather than allowed), then access modification circuitry 40 may modify the read access permission (and provide it as part of modified access permissions 66) so that the requested read access would be denied rather than allowed, thus overriding master 12 read access protection field 72. Flow then ends at end 94. (Note that the flow of FIG. 3 may be repeated upon each access request to memory 36, via memory controller 32.)

Therefore, for each access to non-volatile memory 36 by a master, such as master 12 or 14, access protection control registers 38 provides access permissions 58 which can be used to determine whether or not the current access should be allowed. However, there are situations in which an override of these software programmable registers may be desirable (thus resulting in modified access permissions 66), depending on state information of data processing system 10. For example, in the case where access protection control register 38 is software programmable, the permissions stored within access protection control register 38 may have been changed by unsecure software to erroneously allow access to secure information that needs to be protected. Therefore, access modification circuitry 40 may be used to provide a modification (such as a hardware override) which, depending on certain state information or conditions of data processing system 10, may be used to modify the access permission of access protection control register 38 in order to prevent access to the secure information.

In one example, access may need to be restricted during a debug operation since data processing system 10 is generally more accessible during debug. Therefore, in one embodiment, state information 60 includes information from debug circuitry (not shown) that indicates when debug is enabled. In this case, the permissions of some or all of masters 12 and 14 stored within access protection control register 38 may be modified by access modification circuitry 40.

In another example, during operation from unsecure or unverified memories, access may need to be modified to ensure security of data processing system 10 and prevent corruption that can possibly result due to, for example, errant or hostile software stored within these unsecure or unverified memories.

In another example, access permissions may be modified when a memory has been programmed. For example, referring to FIG. 1, when non-volatile memory 36 is modified, access permissions to non-volatile memory 36 may be modified because it may not be possible to ensure the security of the modified portions of non-volatile memory 36. For example, non-volatile memory 36 may have been modified to include bad data, mis-information, or to store errant or hostile software. In this case, state information 60 may include information provided from within memory controller 32, such as via conductors 64.

In yet another example, access permissions may be modified for a direct memory access (DMA) operation. In this example, state information 60 may include a signal from a DMA to indicate the occurrence of a DMA operation (where, for example, master 12 or 14 may be or include a DMA). In another example, access permissions may be modified upon a boot operation to ensure that secure information remain secure because a system may be boot into an unknown state due to errant firmware, software, or settings. Access permissions may also be modified based on software security verification such that the access permissions stored within access protection control register 38 are not allowed to control accesses (i.e. are overridden or modified) until the software can be verified. Access permissions may also be modified based on security levels of data processing system 10 or of masters 12 and 14. For example, each master may have varying security levels (beyond just secure and unsecure) where, based on the security level during a particular access request, the access permission of control register 38 may be modified. Access permissions may also be modified based on a security monitor operation. For example, a security monitor (not shown) may be present in data processing system 10 which oversees operations within data processing system 10 to ensure that security is not breached. Therefore, upon detection of certain conditions by the security monitor, accesses may be modified accordingly. State information 60 may therefore be used to provide information relating to these states, conditions, and operations to access modification circuitry 40.

Also, in another example, access permissions may be modified based on an operating mode of data processing system or of memory controller 32, as indicated by state information 60. For example, if data processing system 10 enters a reduced level operating state (such as a minimal operating state, where only a basic set of operations is supported), the programmed access permissions of control register 38 may be modified to protect the data processing system 10 while operating at the reduced level. In another embodiment, access permissions may be modified based on a fault monitor (not shown) of data processing system 10. For example, in response to a fault monitor detecting a fault within any portion of data processing system 10, access permissions of control register 38 may be modified to restrict access upon the fault detection. In this example, a signal from the fault monitor may be provided to access modification circuitry 40 via state information 60. In yet another embodiment, access permissions may be modified based on an external bus operation. For example, during an external bus operation, an external source may attempt to access or modify secure information or corrupt memory 36 or data processing system 10. Therefore, access permissions may be restricted for an access during an external bus operation to ensure security of data processing system 10.

Note that many examples were provided above for different situations in which state information (provided, for example, via state information 60) may be used to selectively modify the access permissions of control register 38. Alternate embodiments may use more or less information than those described above. Furthermore, combinations of the above situations may be used where the state information 60 may be combined in any variety of ways to determine when access permissions should be modified, depending on the needs of data processing system 10. That is, state information 60 may be taken from a variety of different resources or sources, including those from within memory controller 32, to indicate the necessary state information to access modification circuitry 40 such that access modification circuitry 40 can properly determine whether or not to modify access permissions. Furthermore, state information may include any type of information reflecting the state or condition of data processing system 10 or any of its components. Also, the state information may indicate trustworthiness of one or more masters (such as masters 12 and 14). Also, note that although most examples above were provided in reference to restricting access permissions, access modification circuitry 40 may also use the state information to increase or broaden access permissions, depending on the design of data processing system 10.

Therefore, it can be appreciated how improved security of a data processing system, include multiple master data processing systems, may be achieved. Access modification circuitry may be used to selectively modify access permissions based on various different types of state information. Therefore, as the state of data processing system 10 changes, security can be maintained as needed by restricting or broadening access permissions on a per access basis. Furthermore, the modifications may be performed on a per master basis and on a per access type basis. The state information may include information received from various portions of data processing system 10, including information within memory controller 32, and may include information received from sources external to data processing system 10. Also, note that access modification circuitry may selectively modify the access permissions using hardware override mechanisms. Alternatively, other hardware, software, or combination thereof, mechanisms may be used to produce modified access permissions 66.

In the foregoing specification, the invention has been described with reference to specific embodiments. However, one of ordinary skill in the art appreciates that various modifications and changes can be made without departing from the scope of the present invention as set forth in the claims below. For example, data processing system 10 and memory controller 32 may be organized differently than as illustrated in the embodiment of FIG. 1. Furthermore, the circuitry may be implemented in any combination of hardware, software, and firmware. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. Access permission circuitry, comprising:
    first access protection circuitry which stores first access permission information corresponding to a first bus master;
    second access protection circuitry which stores second access permission information corresponding to a second bus master;
    access modification circuitry, coupled to the first and second access protection circuitry; and
    an access allowed indicator provided by the access modification circuitry,
    wherein in response to a first access by the first bus master, the access modification circuitry receives first state information and receives the first access permission information,
    wherein based upon the first state information, the access modification circuitry selectively modifies the first access permission information to produce first modified access permission information,
    wherein the first modified access permission information is used to determine whether the access allowed indicator will allow the first access;
    wherein in response to a second access by the second bus master, the access modification circuitry receives second state information and receives the second access permission information,
    wherein based upon the second state information, the access modification circuitry selectively modifies the second access permission information to produce second modified access permission information,
    wherein the second modified access permission information is used to determine whether the access allowed indicator will allow the second access, and
    wherein the first state information and the second state information are provided by different sources.

2. Access permission circuitry as in claim 1, wherein the first state information is provided to the access permission circuitry from a source external to the access permission circuitry.

3. Access permission circuitry as in claim 2, wherein the second state information is generated within the access permission circuitry.

4. Access permission circuitry of claim 1, wherein the first state information indicates trustworthiness of the first bus master.

5. The access permission circuitry of claim 1, wherein the first state information relates to boot operation.

6. Access permission circuitry as in claim 1, wherein the access permission circuitry comprises a portion of a data processing system.

7. Access permission circuitry as in claim 1, further comprising:
    debug circuitry for providing the first state information.

8. Access permission circuitry as in claim 6, further comprising:

direct memory access (DMA) circuitry for providing the first state information.

9. Access permission circuitry as in claim 6, further comprising:
external bus interface circuitry for providing the first state information.

10. Access permission circuitry as in claim 1, wherein the first access is to a non-volatile memory.

11. Access permission circuitry as in claim 1, wherein the first access protection circuitry is software programmable.

12. Access permission circuitry as in claim 1, wherein the first bus master comprises at least one of a master that executes an instruction, a master that performs a direct memory access (DMA) operation, and a master that performs a debug operation.

13. A method for determining access protection, comprising:
receiving a first access request corresponding to a first master;
determining first access permissions corresponding to the first master;
receiving first state information;
selectively modifying the first access permissions based on the first state information;
receiving a second access request from a second master;
determining second access permissions corresponding to the second master;
receiving second state information;
selectively modifying the second access permissions based on the second state information; and
wherein the first state information is provided from a different source than the second state information.

14. A method as in claim 13, wherein the first state information indicates trustworthiness of the first bus master.

15. A method for determining access protection, comprising:
receiving a first access request corresponding to a first master, wherein said first access request is to a slave device;
providing first state information;
determining first access permissions based on said first access request, wherein said first access permissions indicate whether or not said first master is allowed to access said slave device;
selectively modifying said first access permissions based on said first state information;
receiving a second access request corresponding to a second master, wherein said second access request is to the slave device;
providing second state information;
determining second access permissions based on said second access request, wherein said second access permissions indicate whether or not said second master is allowed to access the slave device;
selectively modifying said second access permissions based on said second state information; and
wherein the first state information is provided from a different source than the second state information.

16. A method as in claim 15, wherein said slave device comprises a memory.

17. A method as in claim 16, wherein said memory is non-volatile.

18. A method as in claim 15, wherein said first master comprises at least one of a master that executes instructions, a master that performs direct memory access, and a master that performs a debug operation.

19. A method as in claim 15, wherein said first state information relates to at least one of a debug operation, a memory operation, a direct memory access operation, a boot operation, software security verification, a security monitor operation, an operating mode, and a fault monitor.

* * * * *